US005983316A

United States Patent [19]
Norwood

[11] Patent Number: 5,983,316
[45] Date of Patent: Nov. 9, 1999

[54] COMPUTING SYSTEM HAVING A SYSTEM NODE THAT UTILIZES BOTH A LOGICAL VOLUME MANAGER AND A RESOURCE MONITOR FOR MANAGING A STORAGE POOL

[75] Inventor: Sherri Lynn Norwood, Mountain View, Calif.

[73] Assignee: Hewlett-Parkard Company, Palo Alto, Calif.

[21] Appl. No.: 08/864,805

[22] Filed: May 29, 1997

[51] Int. Cl.$^6$ .............................. G06F 12/00; G06F 13/00
[52] U.S. Cl. ........................ 711/112; 711/111; 711/151; 711/171
[58] Field of Search ........................... 395/800; 711/111, 711/112, 113, 114, 151, 172, 171, 154

[56] References Cited

U.S. PATENT DOCUMENTS

| | | | |
|---|---|---|---|
| 5,450,609 | 9/1995 | Schultz ..................................... | 395/820 |
| 5,673,412 | 9/1997 | Kamo et al. ............................. | 711/114 |
| 5,752,256 | 5/1998 | Fujii et al. ............................... | 711/114 |
| 5,761,705 | 6/1998 | DeKoning et al. ...................... | 711/114 |
| 5,765,204 | 6/1998 | Bakke et al. ............................. | 711/112 |
| 5,778,426 | 7/1998 | DeKoning et al. ...................... | 711/114 |
| 5,784,703 | 7/1998 | Muraoka et al. ........................ | 711/112 |
| 5,787,459 | 7/1998 | Stallmo et al. .......................... | 711/112 |

OTHER PUBLICATIONS

*HP OpenView IT/Operations Integrated Network and Systems Management*, Part No. 5965–7231E, Hewlett–Packard Co., 1997.

*GlancePlus and GlancePlus Pak Software, Technical Data*, Part No. 5964–3950E, Hewlett–Packard, Co., 1995.

*HP Predictive Support/UX Software for HP 9000 Servers*, Part No. 5964–6042E, Hewlett–Packard Co., 1995.

*Foundation Products, Veritas Volume Manager, for SPARC/Solaris*, http:www.veritas.com, Veritas Software 1600 Plymouth Street, Mountain View, CA 94043.

*Primary Examiner*—Tuan V. Thai

[57] ABSTRACT

A computing system includes a storage pool and a system node. The storage pool has a plurality of physical volumes. The physical volumes are grouped into a plurality of physical volume groups. The system node accesses the storage pool. The system node includes a logical volume manager and a resource monitor. The logical volume manager maps the physical volumes into logical volumes. The resource monitor determines which physical volumes in the storage pool have available physical links, and determines a number of copies of data within a first logical volume. The resource monitor also determine whether at least one copy of all data within a logical volume group is available. The resource monitor indicates that at least one copy of all data within the logical volume group is available when physical links to all physical volumes for the logical volume group are up. The resource monitor indicates that at least one copy of all data within the logical volume group is available when a number of physical links which are down is less than a number of physical volume groups which contain a fill copy of data for the logical volume group. The resource monitor indicates that there is not available a copy of all data within the logical volume group when there are no physical links to physical volumes for the logical volume group which are up.

8 Claims, 8 Drawing Sheets

Double-click on a Resourrce Class until the desired Resource Name is displayed. Select a Resource Name and press [ OK ]

Resources Classes:

```
ATM...
Disks...
MIB...                41
LAN...
Scripts...
```

[ View Resource Class Description... ]
42

Resources Names:

```
DISK [0]
DISK [1]
DISK [2]         43
DISK [3]
DISK [4]
```

[ View Resource Description... ]
44

[ OK ]      [ Cancel ]      [ Help ]
 45            46              47

COMPUTING SYSTEM HAVING A SYSTEM NODE THAT UTILIZES BOTH A LOGICAL VOLUME MANAGER AND A RESOURCE MONITOR FOR MANAGING A STORAGE POOL

BACKGROUND

The present invention concerns monitoring resources on a computer and pertains particularly to monitoring disk storage devices.

In computing systems it is often desirable to monitor the operation and status of various resources within the computing system. Once status changes or particular events are detected, these may be sent to an application or management platform for further processing and/or for being made available to a user.

For example, status changes or particular events detected by a resource monitor may be received by a resource monitoring management program such as the OpenView resource monitoring management program available from Hewlett-Packard Company, having a business address of 3000 Hanover Street, Palo Alto, Calif. 94304, or the MC/ServiceGuard resource monitoring management program, also available from Hewlett-Packard Company. Other existing products such as the High Availability Clustered Multi-Processing (HACMP) control application available from IBM Company.

Information about disk and logical volume status is important in a high availability environment. However, information in existing systems is limited. For example, the Logical Volume Monitor (LVM) product, available with the HP-UX operating system available from Hewlett-Packard Company, manages disk storage devices (disks) in logical volumes. A logical volume is a collection of pieces of disk space from one or more disks. Each collection is put together so that the collection appears to the operating system as a single disk.

Like disks, logical volumes can be used to hold file systems, raw data areas, dump areas, or swap areas. Unlike disks, the size of a logical volume can be chosen when the logical volume is created and a logical volume can later be expanded or reduced. Also, logical volumes can be spread across multiple disks.

A logical volume can exist on only one disk or can reside on portions of many disks. The disk space within a logical volume can be used for swap, dump, raw data or a file system can be created thereon.

The LVM program and disk drivers for individual disks write messages to a system log providing some information ultimately available to a user. For example, HP OpenView IT/Operations program available from Hewlett-Packard Company can be configured to monitor messages from the system log and make this information available to a user. However, there is a lot of desirable information that is not currently expressed to a user in a form that is useful to the user.

For example, within a logical volume, data can be mirrored on two or more individual disks. This means that an exact copy of the data is stored in two or more separate places. This allows for the data to be obtained from a back-up location in the case of an error which prevents the data from being obtained from a primary location. This is done transparent to a user. For example, this functionality is implemented by the MirrorDisk/UX product available from Hewlett-Packard Company. Nevertheless, it may be interesting to some users to know how many copies of particular data are currently available and to know which particular physical devices are currently available.

Because applications cannot detect if a particular disk is down or if a link to the disk is down, for high availability configurations, multiple links to the disk are required even when mirroring is handled by arrays. These multiple links, however consume I/O slots and limit capacity of the computing system.

Within the HP-UX operating system there currently is an enhancement which allows applications operating within the HP-UX environment to set an input/output (I/O) timeout. This is done, for example, by the application setting a time-out. All I/O calls return with an error if the timeout is exceeded. Without this enhancement, an I/O call will hang indefinitely if the disk is down. However, this enhancement requires each application to be modified.

SUMMARY OF THE INVENTION

In accordance with the preferred embodiment of the present invention, memory storage resources within a computing system are monitored. Particularly, a resource monitor monitors which physical volumes in a storage pool have available physical links. In addition, resource monitor monitors a number of copies of data within each logical volume of storage.

For example, the resource monitor monitors which physical volumes in a storage pool have available physical links by periodically sending a SCSI inquiry to each physical volume in the storage pool to determine whether a physical link to each physical volume is available.

Likewise, the resource monitor monitors a number of copies of data within each logical volume of storage by first ascertaining whether logical volumes containing the copies of data are active. When the resource monitor detects that the logical volume is not active, the resource monitor indicates that there are no available copies of data within the logical volume. When the resource monitor determines that the logical volume is active, the resource monitor counts a number of "good" (i.e., not stale or missing) copies for each logical extent within the logical volume. The resource monitor detects a smallest number of "good" copies for any logical extent of the logical volume. "good" copies are those which are not stale and are not missing. The resource monitor indicates that the available number of copies of data is equal to the smallest number of good copies for any logical extent.

In the preferred embodiment of the present invention, the resource monitor also determines whether at least one copy of all data within a logical volume group is available. For example, the resource monitor indicates that at least one copy of all data within the logical volume group is available when physical links to all physical volumes for the logical volume group are up. The resource monitor indicates that at least one copy of all data within the logical volume group is available when a number of physical links which are down is less than a number of physical volume groups which contain a full copy of data for the logical volume group. The resource monitor indicates that there is not available a copy of all data within the logical volume group when there are no physical links to physical volumes for the logical volume group that are up.

Additionally, the resource monitor indicates there is not available a copy of all data within the logical volume group when a number of physical links to all physical volumes for the logical volume group which are up is greater than zero and less than the number of physical volumes in the physical volume group. Also, the resource monitor indicates there is available a copy of all data within the logical volume group when physical links to all physical volumes within a physical volume group are all up. When physical links to all physical volumes within a physical volume group are not all up, a number of physical links to all physical volumes for the logical volume group which are up is greater than zero, and a number of physical links which are down is not less than a number of physical volume groups which contain a full copy of data for the logical volume group, the resource monitor additionally indicates that it is not known whether there is available a copy of all data within the logical volume group Also, in one preferred embodiment of the present invention, the resource monitor is a disk resource module within a resource monitoring system.

The present invention provides additional ability and flexibility to monitor the current state of a storage pool.

BRIEF DESCRIPTION OF THE DRAWINGS

FIG. 7 shows another display window for a graphics user interface for a resource monitoring system in accordance with a preferred embodiment of the present invention.

DESCRIPTION OF THE PREFERRED EMBODIMENT

Figure 1:
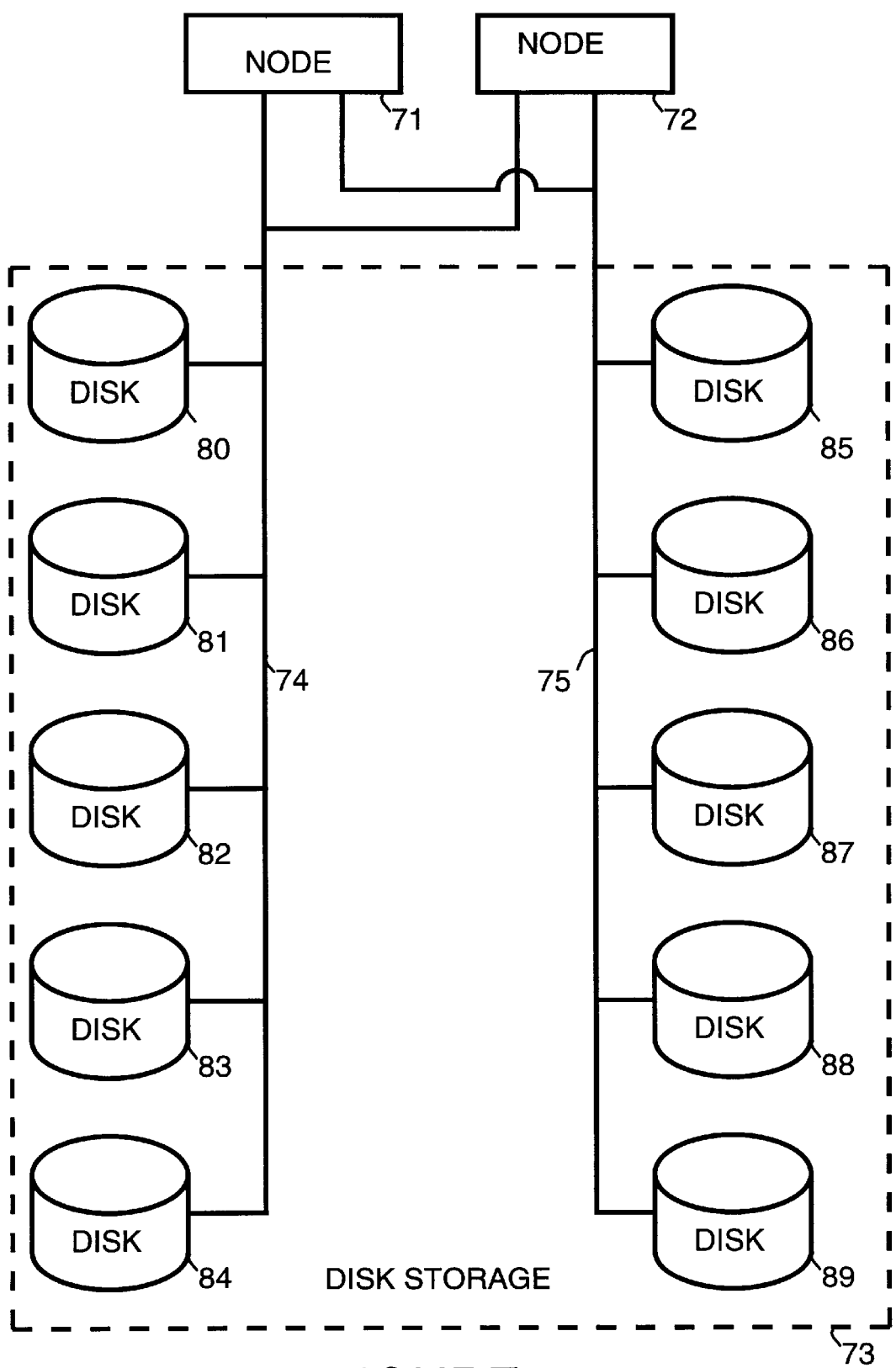
FIG. 1 shows a block diagram of a high availability computer system.

FIG. 1 shows a block diagram of a high availability computer system. A node 71 and a node 72 each accesses disk storage 73. A disk storage element 80, a disk storage element 81, a disk storage element 82, a disk storage element 83 and a disk storage element 84 are accessed through a first bus 74. A disk storage element 85, a disk storage element 86, a disk storage element 87, a disk storage element 88 and a disk storage element 89 are accessed through a second bus 75. For example, bus 74 is a Small Computer Systems Interface (SCSI) and bus 75 is a SCSI bus. Each of disk storage elements 80 through 89 is, for example, a disk drive, an array of disks or some other disk-based storage device, portion of a device or combination of devices.

Figure 2:
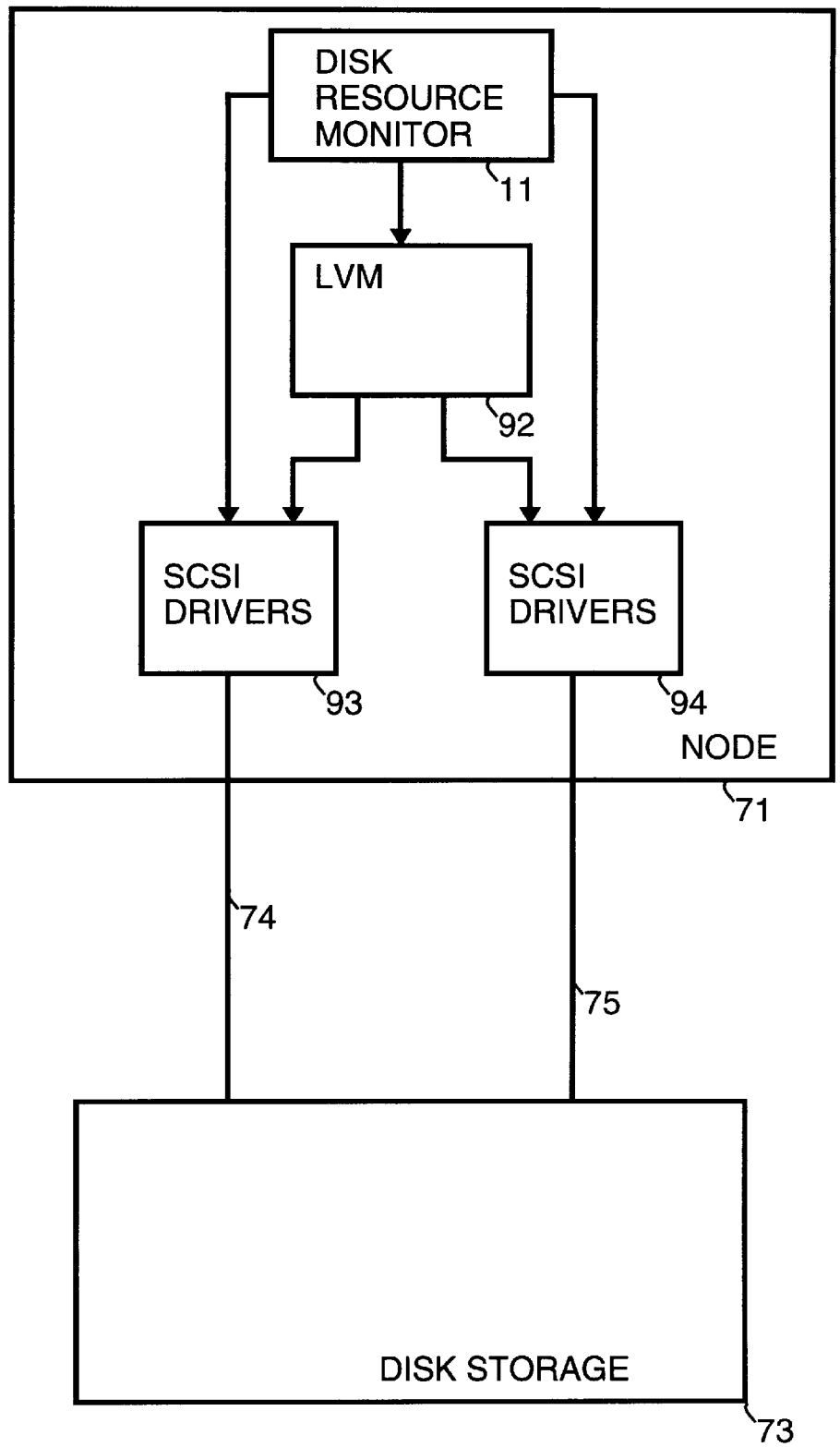
FIG. 2 shows a disk resource monitor functioning within a node of the high availability computer system shown in FIG. 1 in accordance with a preferred embodiment of the present invention.

FIG. 2 shows a disk resource monitor 11 functioning within node 71. SCSI drivers 93 are used to control communication on SCSI bus 74. SCSI drivers 94 are used to control communication on SCSI bus 75. A Logical Volume Monitor (LVM) program 92 manages disk storage elements 80 through 89 into logical volumes.

For example, each of disk storage elements 80 through 89 represents a physical volume. The physical volumes are grouped in accordance to the bus on which the physical volume is connected. Thus disk storage elements 80, 81, 82, 83 and 84 are in one physical volume group and disk storage elements 85, 86, 87, 88 and 89 are in a second physical volume group.

Additionally, disk storage 73 is managed as a two-way mirrored disk configuration. Disk storage 73 consists of one or more logical volumes, each of which is two-way mirrored. Each mirror copy of a logical volume is stored in a different physical volume group. Thus, on the first mirror are disk storage elements 80, 81, 82, 83 and 84. On the second mirror are disk storage elements 85, 86, 87, 88 and 89.

The two physical volume groups, for example, contain identical copies of the data. LVM program 92 views the data as residing in a single logical volume group. When accessing data within the single logical volume group, the data can be obtained from either physical volume group which map to the single logical volume group.

While FIG. 1 shows two busses, and physical volumes connected to the busses forming two physical volume groups, this is only for illustrative purposes. For example, disk storage 73 could be arranged utilizing three busses, and physical volumes connected to the three busses could form three physical volume groups which all map to a single logical volume group. Additionally, the number of physical volumes per physical volume group can vary. Further, it is not necessary that each physical volume group to utilize a single dedicated bus. Multiple physical volume groups could be connected to a single bus or multiple busses could be used to connect a single volume group.

Disk resource monitor 11 utilizes information obtained from LVM program 92 and SCSI drivers 93 and 94 to determine status within disk storage 73. For example, the information obtained from LVM can be used to detect how many copies of data exist within each logic volume. Disk resource monitor 11 can use SCSI drivers 93 and 94 to send SCSI inquiries to each physical volume to determine whether a physical link to the physical volume is up. Disk resource monitor 11 uses the information, for example, to determine the number of complete copies of data for a logical volume currently available via software mirrors.

Figure 3:
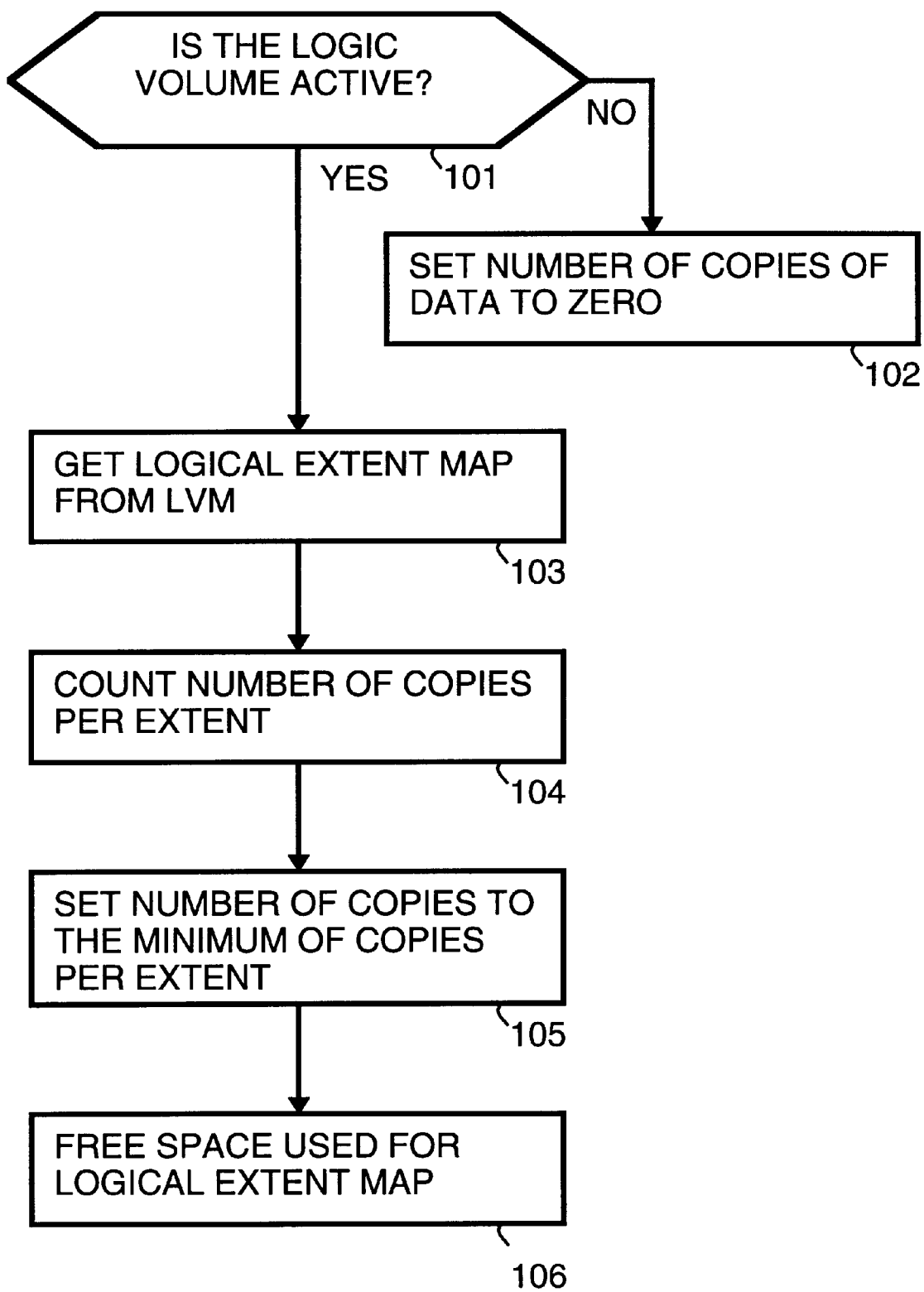
FIG. 3 is a flowchart which shows how a resource monitor determines a number of copies of data available in disk storage in accordance with a preferred embodiment of the present invention.

For example, FIG. 3 is a flowchart which illustrates how disk resource monitor 11 determines how many copies of data are available for a selected logical volume. In a step 101, disk resource monitor 11 checks if the logical volume is active. This is done, for example making a query to LVM 92. For example, the logical volumes may not be active if node 72 has access to disk storage 73 and as a result node 71 is excluded from accessing disk storage 73.

If in step 101 disk resource monitor 11 determines the selected logical volume is not active, in a step 102 disk resource monitor 11 sets to zero the number of copies of data available.

If in step 101 disk resource monitor 11 determines the selected logical volume is active, in a step 103 disk resource monitor 11 gets the logical extent map for the selected logical volume from LVM program 92. The logical extent map shows the number of logical extents and the number of "good" copies of each logical extent. A logical extent is the basic allocation unit for a logical volume. A physical extent is the addressable units into which LVM program 92 divides each disk storage element. Each physical extent maps to a logical extent. When the logical extent is mirrored this means more than one physical extent maps to a single logical extent. For two-way mirroring of a logical extent, two physical extents map to the logical extent. The two physical extents which map to a single logical extent both contain identical data. For three-way mirroring of a logical extent, three physical extents map to the logical extent. The three physical extents which map to the logical extent all contain identical data. A "good" copy of a logical extent means that the physical extent which actually stores the copy is not stale or missing.

In a step 104, disk resource monitor 11 counts the number of "good" physical copies (i.e., the number of physical extents which are not stale or missing) for each logical extent. In a step 105, disk resource monitor 11 sets the number of "good" copies of data available to the smallest number of physical copies for any logical extent. In a step 106, disk resource monitor 11 frees up the memory space used to store the logical extent map obtained from LVM program 92.

Disk resource monitor 11 utilizes SCSI drivers 93 to inquire as to the status of physical volumes (i.e., disk storage elements 80, 81, 82, 83 and 84) connected to bus 74. Disk resource monitor 11 utilizes SCSI drivers 94 to inquire as to the status of physical volumes (i.e., disk storage elements 85, 86, 87, 88 and 89) connected to bus 75. As a result of polling each physical volume, disk resource monitor 11 determines the status of the physical link to each physical volume. If the inquiry is successful, the physical volume is marked "UP". If the inquiry is returned with a "DEVICE BUSY", disk resource monitor 11 will retry the inquiry, for example, two additional times. If the inquiry is still returned with a "DEVICE BUSY", disk resource monitor 11 will mark the status of the physical volume is "BUSY". If the inquiry fails to receive a response, disk resource monitor 11 will mark the physical volume as being "DOWN". If, because of an error disk resource monitor 11 could not determine status of the physical volume, disk resource monitor 11 will mark the status as "UNKNOWN" and report an error.

Also, disk resource monitor 11 is able to indicate status for each logical volume group, particularly to indicate whether there is at least one complete copy of data available. This is done, for example, as set out in FIG. 4.

Figure 4:
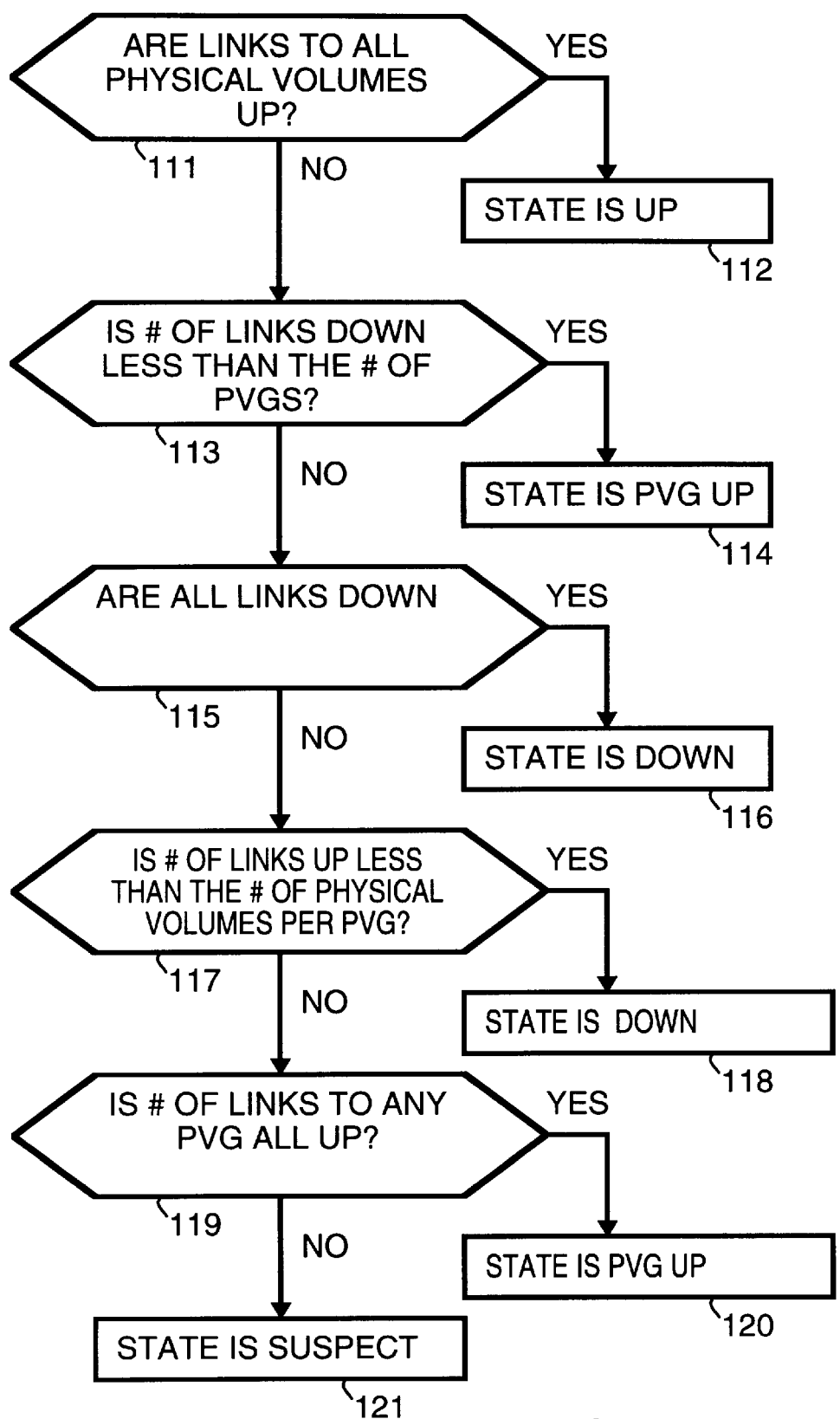
FIG. 4 is a flowchart which shows how a resource monitor determines whether a full copy of data for a logical volume group is available in disk storage in accordance with a preferred embodiment of the present invention.

As shown in FIG. 4, in a step 111 disk resource monitor 11 determines whether all the physical links to the physical volumes (and thus all the physical volumes) are "UP". This is determined from the status of physical volumes as discovered using SCSI drivers 93 and SCSI drivers 94 above.

If in step 111 disk resource monitor 11 determines that all physical volumes are up, in a step 112 disk resource monitor 11 recognizes that there is a complete copy of data available for the logical volume group and thus the logical volume group is "UP".

In a step 113, disk resource monitor 11 determines whether the number of physical links to physical volumes (and thus all physical volumes) which are "DOWN" is less than the number of physical volume groups. As discussed above, the status of physical volumes as discovered using SCSI drivers 93 and SCSI drivers 94 to generate SCSI inquiries. For the purpose of the logic in FIG. 4, physical volumes with the status of "BUSY" or "UNKNOWN" are considered to be "DOWN".

If in step 113 disk resource monitor 11 determines that the number of physical links to physical volumes which are "DOWN" is less than the number of physical volume groups, in a step 114 disk resource monitor 11 recognizes that there is a complete copy of data available for the logical volume group and thus the logical volume group is "PVG UP". "PVG UP" indicates that there is at least one physical volume group in which all of the physical volumes are available and therefore all the data is available. This step assumes that each physical volume group contains a complete copy of data for a logical volume group.

In a step 115, disk resource monitor 11 determines whether all the physical links are down. This is determined from the status of physical volumes as discovered using SCSI drivers 93 and SCSI drivers 94 above.

If in step 115 disk resource monitor 11 determines that the physical links to all physical volumes are "DOWN", in a step 116 disk resource monitor 11 recognizes that the logical volume group is "DOWN".

In a step 117, disk resource monitor 11 determines whether the number of physical links to physical volumes (and thus all physical volumes) which are "UP" is less than the number of physical volumes in a physical volume group.

If in step 117 disk resource monitor 11 determines that the number of physical links to physical volumes which are "UP" is less than the number of physical volumes in a physical volume group, in a step 118 disk resource monitor 11 recognizes that there is not a complete copy of data available for the logical volume group and thus the logical volume group is "DOWN". This step assumes that each physical volume group contains a complete copy of data for each logical volume in the logical volume group.

In a step 119 disk resource monitor 11 determines whether all the physical links to all the physical volumes in a physical volume group are "UP". This is determined from the status of physical volumes as discovered using SCSI drivers 93 and SCSI drivers 94 above.

If in step 119 disk resource monitor 11 determines that all physical volumes for any physical volume group are up, in a step 120 disk resource monitor 11 recognizes that there is a complete copy of data available for the logical volume group and thus the logical volume group is "PVG UP". This step assumes that each physical volume group is a complete copy of data for a logical volume group.

If in step 119 disk resource monitor 11 determines that all physical volumes for any physical volume group are not up, in a step 121 disk resource monitor 11 recognizes that it is uncertain as to whether a complete copy of data available for the logical volume group and thus the logical volume group is "SUSPECT".

Figure 5:
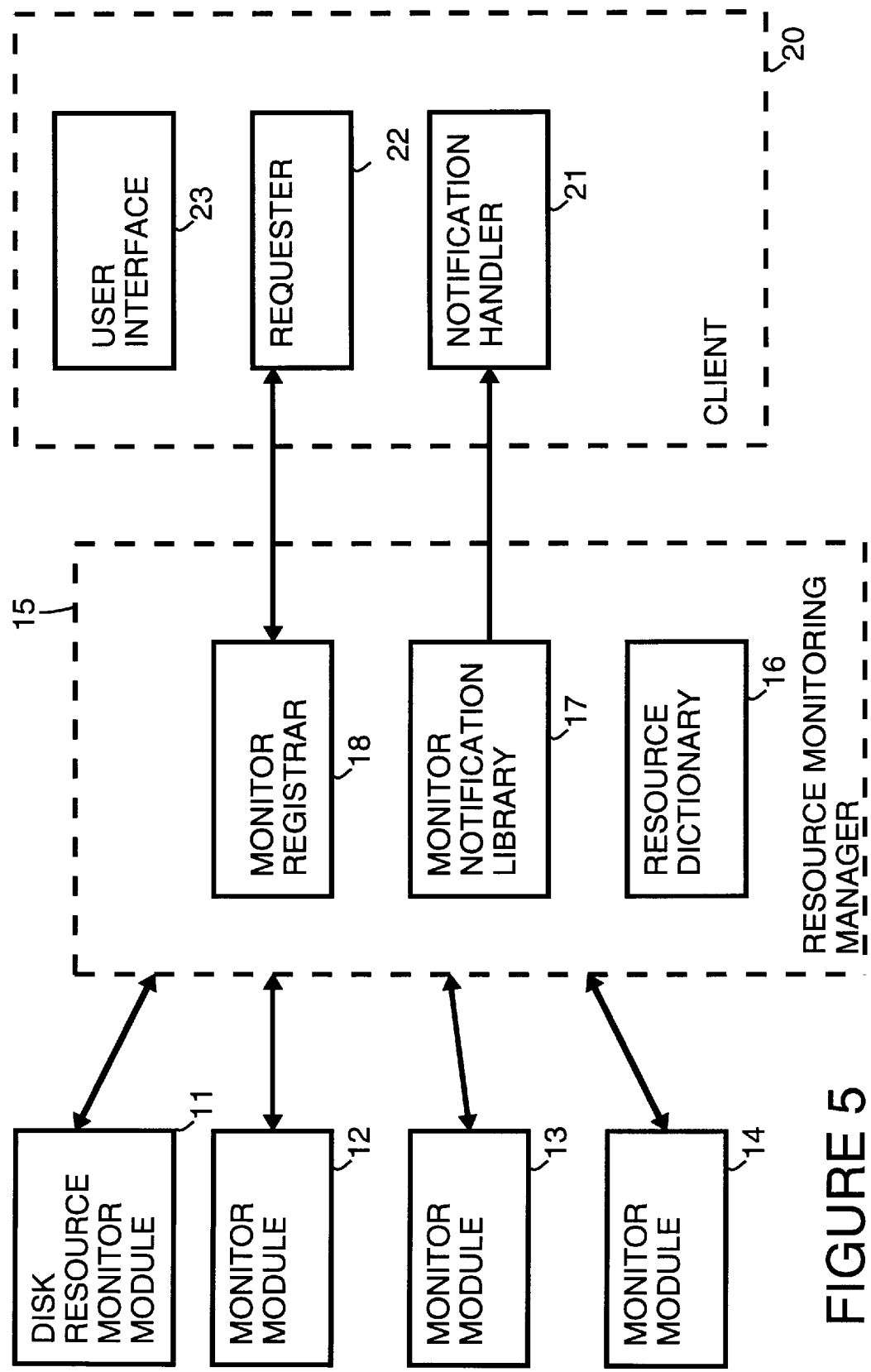
FIG. 5 shows a block diagram of a resource monitoring system in accordance with a preferred embodiment of the present invention.

Disk resource monitor 11 can be integrated, for example, as a module within a resource monitoring system. For example, FIG. 5 shows a block diagram of a resource monitoring system. Disk resource monitor 11 is integrated within the system as a disk resource monitor module. Other resource monitors also may exists within the resource monitoring system. For example, FIG. 5 shows a resource monitor module 12, a resource monitor module 13 and a resource monitor module 14. The system resources monitored by resource monitors 12 through 14 may include, for a example, a network interface, central processing unit (CPU) statistics, a network server and/or any other resource within a computing system.

A specific resource monitoring module is provided for data stored in standard Management Information Base (MIB) variables. Interactions with resource monitoring manager 15 allows for notifications involving MIB variables to be sent using mechanisms other than the standard Simple Network Management Protocol (SNMP).

Division of resources into resource classes and subclasses is useful for configuration purposes and makes it possible for a user to discover new monitors and resources dynamically. Resource classes are categories of resources. For example, there could be a resource class which includes disk drives and a resource class that includes local area networks (LAN). When a resource class is large, the resource class can be divided into several resource subclasses. When a resource subclass is large, the resource subclass can also be divided into more specific subclasses.

The most specific subclasses (or classes if there are no subclasses) are composed of resource instances. A resource instance is an actual instantiation of a resource or resource class. For example, "disk0" may refer to a particular physical volume within disk storage 73.

Each of resource monitor modules 11 through 14 is a process or command or script that is used to obtain the status of a particular resource. Each resource monitor module checks one or more resources on the local system and provides event notifications, if appropriate. The resource monitor modules 11 through 14 each communicate with a resource monitoring manager 15 using a standard interface, as is more fully described below.

Resource monitoring manager 15 includes a monitor registrar 18, a monitor notification library 17 and a resource dictionary 16. Resource monitoring manager 15 interfaces between resource monitor modules 11 through 14 and a resource management client 20. A resource management client 20 includes a user interface 23, a requester 22 and a notification handler 21. While only a single resource management client is shown in FIG. 5, multiple resource management clients can simultaneously interact with resource monitoring manager 15.

User interface 23 provides a graphic user interface to a user of the system. When the user communicates to resource management client 20, through user interface 23, a request to use the resource monitor services, requester 22 makes a request to monitor registrar to determine the available resources. Monitor registrar 18 answers the request using data obtained from resource dictionary 16. When monitor registrar 18 receives a request that exceeds the scope of the information in resource dictionary 16, monitor registrar 18 will pass the request to a running resource monitor module or launch an appropriate resource monitor module and pass the requests down to that resource monitor module. The resource monitor module is determined by monitor registrar 18 doing a best match of the resource name specified by the user, matching the resource name left-to-right using a string comparison with entries in resource dictionary 16.

The resource monitor module which receives the requests will answer back to monitor registrar 18, which in turn will return the answer to requester 22. Since the information about resources is stored within the resource dictionary and/or is obtained from running resource monitor modules, this allows resource monitor modules to be added and/or subtracted without any changes being made to resource management client 20. Further, this allows for changes to resource monitor modules to be added and/or subtracted dynamically, that is, while resource management client 20 is running. In the preferred embodiment, the only part of resource monitoring manager 15 that changes when a new resource monitor module is added is resource dictionary 16, which stores information about the new resource monitoring module.

Figure 6:
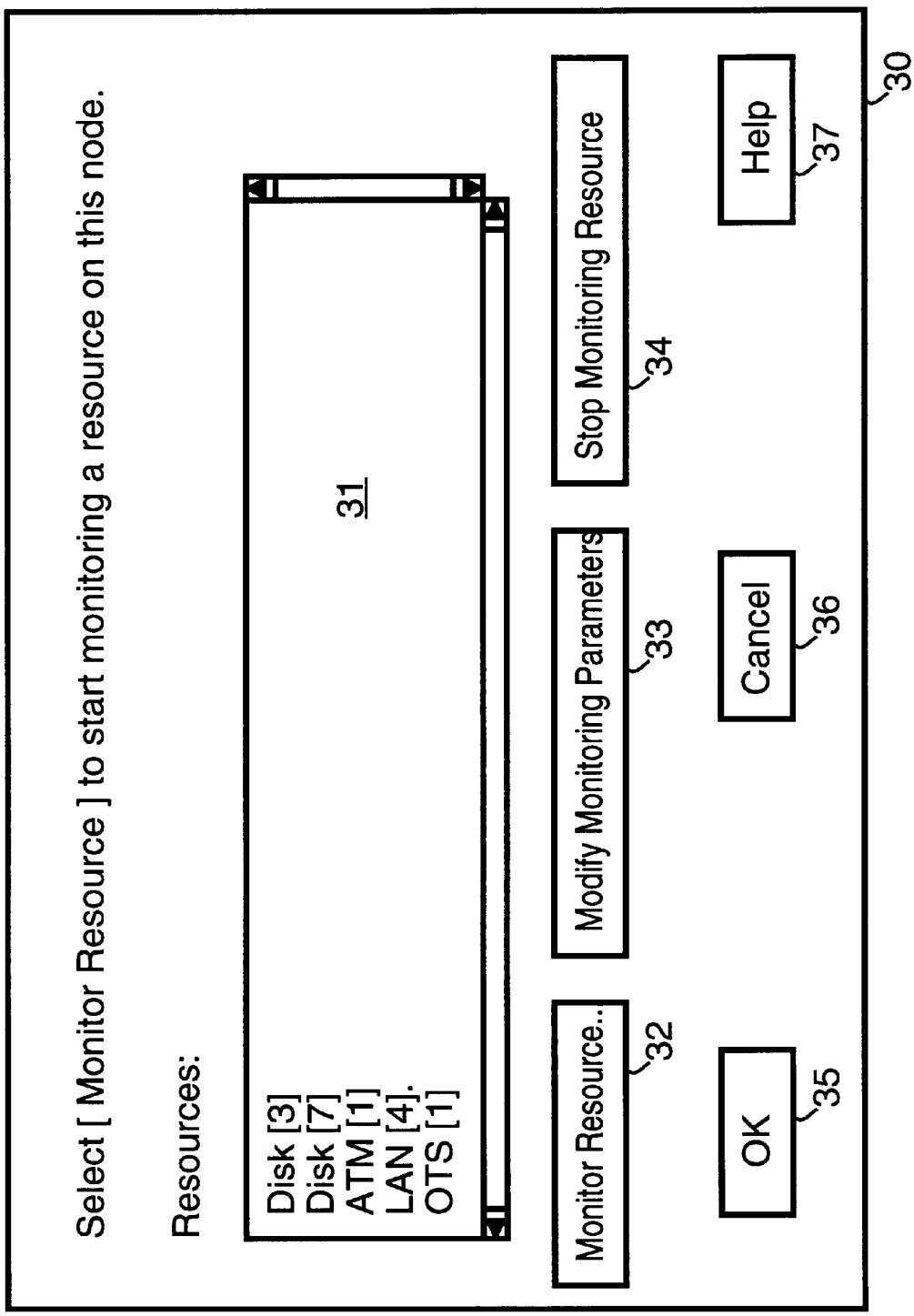
FIG. 6 shows a display window for a graphics user interface for a resource monitoring system in accordance with a preferred embodiment of the present invention.

The graphics user interface presented to a user by user interface 23 includes various windows or screens with which the user can interact. For example, FIG. 6 shows a "Top Level" window 30 which is used to inform a user as to which resources are currently being monitored. Resources currently being monitored are listed in an area 31. When a monitor resource button 32 is selected, the user is taken to a "Monitor Resources" window 40 (shown in FIG. 7) is shown. When a resource already being monitored is selected from area 31, and a modify monitoring parameters button 33 is selected, the user is taken to a "Monitoring Parameters" window 50 (shown in FIG. 8). "Top Level" window 30 also includes an OK button 35, a cancel button 36 and a help button 37.

The user arrives at "Monitor Resources" window 40, shown in FIG. 7 by selecting monitor resource button 32 of "Top Level" window 30, shown in FIG. 6. "Monitor Resources" window 40 displays available resource classes in area 41 and resource names in area 43 for a selected resource class. The user can navigate through the resource hierarchy by selecting a resource class in area 41 and then selecting a resource within the selected class in area 43. For example in FIG. 3 resources listed are physical disk volumes.

Information about a resource class selected in area 41 can be accessed by selecting a View Resource Class Description button 42. Information about a resource selected in area 43 can be accessed by selecting a View Resource Description button 44. As indicated above and further described below, the information displayed in "Monitor Resources" window 40 is obtained by resource management client 20 dynamically by sending requests for information to monitor registrar 18. "Monitor Resources" window 40 also includes an OK button 45, a cancel button 46 and a help button 47. Once a resource in area 43 is selected and OK button 45 is activated, the user is taken to "Monitoring Parameters" window 50, shown in FIG. 8.

Figure 8:
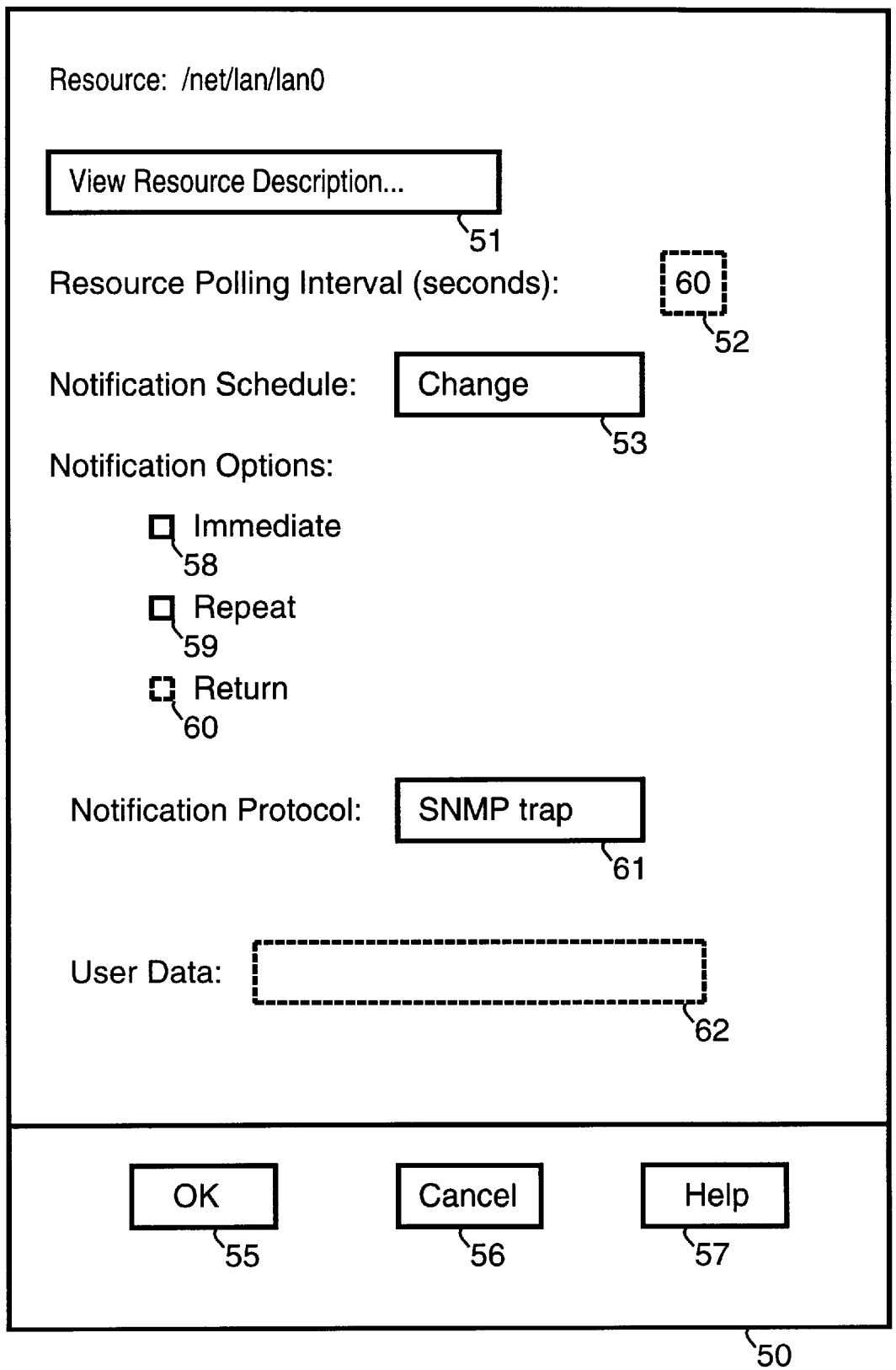
FIG. 8 shows another display window for a graphics user interface for a resource monitoring system in accordance with a preferred embodiment of the present invention.

The user arrives at "Monitoring Parameters" window 50, shown in FIG. 8 by selecting modify monitoring parameters button 33 of "Top Level" window 30, shown in FIG. 6, or by selecting a resource in area 43 and activating OK button 45 from "Monitor Resources" window 40. As indicated above and further described below, the information displayed in "Monitoring Parameters" window 50 is obtained by resource management client 20 dynamically by sending requests for information to monitor registrar 18. "Monitoring Parameters" window 50 includes an indication of various monitor parameters for the selected resource. A resource description can be viewed by activating a view resource description button 51. A resource polling interval is specified in a box 52. The resource polling interval specifies how often the resource monitor module should check whether the resource value meets the notification criteria.

A notification schedule is specified in a box 53. In the preferred embodiment the choices are forced notification, change notification and conditional notification. If forced notification is selected, the resource monitor module sends a notification message at every polling interval. If change notification is selected, the resource monitor module sends a notification message whenever the value of the resource changes. If conditional notification is selected, the resource monitor module sends a notification message whenever the resource value matches a specified criteria. The criteria is defined by an operator and a threshold value. The threshold value is used to compare against values of the operator reported by the resource monitor module.

Notification type is selected by choosing from among immediate notification selection button 58, repeat notification button 59 and return notification selection button 60.

Immediate notification indicates the resource monitor module will send an initial notification message upon starting to monitor the resource. Repeat notification indicates that, when the notification schedule is not forced notification, the notification will continue as long as the criteria is still met. Return notification indicates that if the notification is not forced notification, notification will be sent by the resource monitor module when the resource value crosses the threshold and returns to "normal".

A notification protocol is set out in box 61. In addition to Simple Network Management Protocol (SNMP), other notification protocols such as the Transmission Control Protocol (TCP) or the User Datagram Protocol (UDP) may be used.

Additional user data may be written by a user into a box 62. "Monitoring Parameters" window 50 also includes an OK button 55, a cancel button 56 and a help button 57.

After the resources to monitor are identified by a user using user interface 23, requester 22 forwards monitoring requests to monitor registrar 18. Each monitoring request contains information about what to monitor and who to notify when something interesting happens, as indicated by the user using user interface 23. Monitor registrar 18 passes this information to the appropriate resource monitor module using a "Monitor request" message. The "Monitor request" messages sent from monitor registrar 18, for example, contain essentially the same information as the monitor requests sent from the requester 22 to monitor registrar 18, except however, that the "Monitor request" messages sent from monitor registrar 18 may be reformatted in order to conform to the implemented standard interface between resource monitoring manager 15 and the resource monitor modules.

The "Monitor request" message sent by monitor registrar 18 to the resource monitor module describes how a resource is to be monitored. The "Monitor request" message indicates, for example, what resources to monitor, how often to check, what values, events or series of events warrant notification and which resource management client to notify. This information is obtained, for example, from the information supplied by a user interacting with "Monitoring Parameters" window 50 shown in FIG. 8.

The resource monitor module which receives the request will check the resource as specified in the monitor request. The monitor request can be for immediate or periodic checking against thresholds or state changes. Additional monitor types also may be used. When the resource reaches a condition which requires notification, the resource monitor module will notify resource monitoring manager 15 through monitor notification library 17. Execution of the appropriate routine within monitor notification library 17 will result in the notification being forwarded to notification handler 21. The use of notification library 17 shield the resource monitor modules from having to know how to send notifications of a particular type.

In addition to "monitor request" other messages flow between monitor registrar 18 and the memory module. For example, a resource monitor module will send an "I am alive" message to monitor registrar to indicate that the resource monitor module is running and is able to accept requests.

In order to get resource subclasses, monitor registrar 18 sends to the resource monitor module a "Get subclass request" message. In response, the resource monitor module application sends a series of "Get subclass reply" messages, one "Get subclass reply" message for each existing subclass of the resource.

When monitor registrar 18 receives a request from resource management client 20 for descriptive information about a resource, monitor registrar 18 either obtains the information from resource dictionary 16 or passes along the request to an appropriate resource monitor module by sending an "Information request" message to the appropriate resource monitor module. The resource monitor module replies with an "Information reply" message which contains the requested information.

In order for monitor registrar 18 to determine which resources are being monitored by a particular resource monitor module, monitor registrar sends a "Status request message" to the resource monitor module. The resource monitor module returns a "Status reply" message which indicates which resources are being monitored.

Running resource monitor modules also can pass messages between themselves. For example, when a resource monitor module instance detects that another resource monitor module instance of itself is already running, the resource monitor module instance will send a "Stay alive" message, wait for a response, and then terminate. When a resource monitor module instance receives a "Stay alive" message, it returns a "Stay alive reply" message. This helps ensure that at most one instance of a resource monitor module is running on the system.

In the preferred embodiment, each resource monitor module responds to messages from monitor registrar 18 by making library calls for routines within the resource monitor module. For example, when executing a "Startup" call, the resource monitor module sets up communication with monitor registrar 18. If there is another instance of the resource monitor module, the resource monitor module negotiates with the other instance of the resource monitor module to see which will run. When resource monitor module has completed initialization, the resource monitor module will send an "I am alive" message to monitor registrar 18. Monitor registrar 18 will then register the resource monitor module as currently running and available.

When executing a "Receive Messages" call, the resource monitor module waits for messages from monitor registrar 18. While waiting, the resource monitor module handles messages passed between resource monitor modules (such as the "Stay alive" messages described above). Additionally the monitor module keeps track of the time to determine when any resources will need to be checked. The resource monitor module will return from the "Receive Messages" call when there is a message from monitor registrar 18 or when it is time for the resource monitor module to check the value of a resource.

When executing a "Build notification entry" call, the resource monitor module builds a notification entry. The notification entry is a structure for storing a request from monitor registrar 18 for a resource to be monitored. The notification entry includes the monitor request information, the current value of the resource to be monitored and some historical information about the resource. The "Build notification entry" call is made in response to monitor registrar 18 making a request for the resource to be monitored.

When executing a "Add notification entry" call, the resource monitor module adds a notification entry built with the "Build notification entry" call to a list of all other monitor requests received by the resource monitor module.

When executing a "Delete notification entry" call, the resource monitor module deletes a notification entry added with the "Add notification entry" call from the list of all other monitor requests maintained by the resource monitor module.

When executing a "Determine notification" call, the resource monitor module determines whether the value of a resource retrieved by the resource monitor module and placed into the notification entry structure for the resource, warrants sending a notification to the resource management client. This is done by checking the value of the resource against the notification criteria specified in the monitor request.

When executing a "Send event notification" call, the resource monitor module builds up a notification message based on the information in the notification entry. The notification is then sent to resource monitoring manager 15 which forwards the notification to requester 22 of resource management client 20. The "Send event notification" call is used whenever a notification is to be sent by the resource monitor module.

Disk resource monitor 11 provides flexible event notification. For example, events which disk resource monitor 11 can monitor include indicating within a specified polling interval whether a disk mirror failed, whether a physical volume became unreachable via a particular path, and/or whether a complete copy of all data exists for a logical volume group.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computing system comprising:
   a storage pool having a plurality of physical volumes, the physical volumes being grouped into a plurality of physical volume groups; and,
   a system node which accesses the storage pool, the system node comprising:
      a logical volume manager which maps the physical volumes into logical volumes, and
      a resource monitor comprising:
         first inquiry means for determining which physical volumes in the storage pool have available physical links,
         second inquiry means for determining from the logical volume manager a number of copies of data within a first logical volume, and
         copy determining means for determining whether at least one copy of all data within a logical volume group is available, wherein the copy determining means:
            indicates that at least one copy of all data within the logical volume group is available when physical links to all physical volumes for the logical volume group are up,
            indicates that at least one copy of all data within the logical volume group is available when a number of physical links which are down is less than a number of physical volume groups which contain a full copy of data for the logical volume group, and
            indicates that there is not available a copy of all data within the logical volume group when there are no physical links to physical volumes for the logical volume group which are up.

2. A computing system as in claim 1 wherein the copy determining means additionally indicates there is not available a copy of all data within the logical volume group when a number of physical links to all physical volumes for the logical volume group which are up is greater than zero and less than the number of physical volumes in the physical volume group.

3. A computing system as in claim 1 wherein the copy determining means additionally indicates there is available a copy of all data within the logical volume group when physical links to all physical volumes within a physical volume group are all up.

4. A computing system as in claim 1 wherein the copy determining means additionally indicates that it is not known whether there is available a copy of all data within the logical volume group when physical links to all physical volumes within a physical volume group are not all up, a number of physical links to all physical volumes for the logical volume group which are up is greater than zero, and a number of physical links which are down is not less than a number of physical volume groups which contain a full copy of data for the logical volume group.

5. A method for monitoring resources of a computing system comprising the steps of:
   (a) monitoring which physical volumes in a storage pool have available physical links;
   (b) monitoring a number of copies of data within a logical volume; and,
   (c) determining whether at least one copy of all data within a logical volume group is available, wherein step (c) comprises the following substeps:
      (c.1) if physical links to all physical volumes for the logical volume group are up, indicating that at least one copy of all data within the logical volume group is available,
      (c.2) if a number of physical links which are down is less than a number of physical volume groups which contain a full copy of data for the logical volume group, indicating that at least one copy of all data within the logical volume group is available, and
      (c.3) if there are no physical links to physical volumes for the logical volume group which are up, indicating that there is not available a copy of all data within the logical volume group.

6. A method as in claim 5 wherein step (c) additionally comprises the following substep:
   (c.4) if a number of physical links to all physical volumes for the logical volume group which are up is greater than zero and less than the number of physical volumes in the physical volume group, indicating there is not available a copy of all data within the logical volume group.

7. A method as in claim 5 wherein step (c) additionally comprises the following substep:
   (c.4) if physical links to all physical volumes within a physical volume group are all up, indicating there is available a copy of all data within the logical volume group.

8. A method as in claim 5 wherein step (c) additionally comprises the following substep:
   (c.4) when physical links to all physical volumes within a physical volume group are not all up, a number of physical links to all physical volumes for the logical volume group which are up is greater than zero, and a number of physical links which are down is not less than a number of physical volume groups which contain a full copy of data for the logical volume group, indicating that it is not known whether there is available a copy of all data within the logical volume group.

* * * * *